Figure 1:
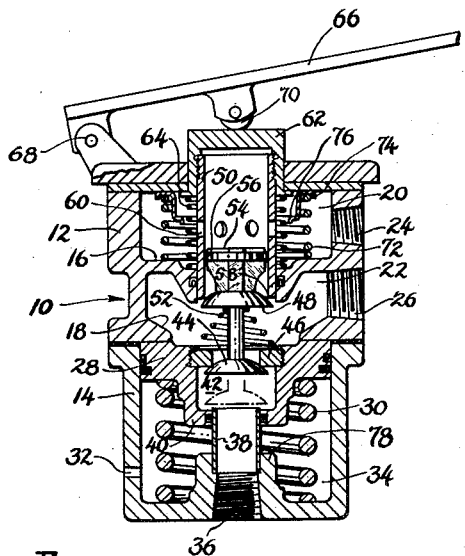

Nov. 5, 1957 E. R. FITCH ET AL 2,812,218
BRAKE VALVE
Filed April 6, 1953

INVENTORS
Ellery R. Fitch
Charles E. Gates
BY Scrivener & Parker
ATTORNEYS

United States Patent Office 2,812,218
Patented Nov. 5, 1957

2,812,218

BRAKE VALVE

Ellery R. Fitch and Charles E. Gates, Elyria, Ohio, assignors to Bendix-Westinghouse Automotive Air Brake Company, Elyria, Ohio, a corporation of Delaware Application April 6, 1953, Serial No. 346,874

7 Claims. (Cl. 303—54)

This invention relates to control valves and more particularly to brake valves of the self-lapping type which are especially adaptable for controlling the operation of fluid pressure braking mechanism.

Various types of brake valve devices have heretofore been proposed for use in compressed air or other fluid pressure braking systems for controlling the application of the vehicle brakes. For the most part, such valves have been of the self-lapping type employing pressure responsive members of substantial size which are subjected at all times to the pressure of the fluid conducted to the brake actuators. With valves of this character, it is necessary for the operator to exert sufficient pedal pressure to overcome the brake actuator pressure to which the pressure responsive members are subjected, and in some cases, the necessary manual effort may be as high as three hundred pounds in order to charge the brake actuators to seventy-five pounds per square inch. Such a high pedal load may be objectionable in that it is tiresome to the operator and may render it difficult for him to accurately control the application and release of the brakes.

It is accordingly, the principal object of the present invention to provide a novel brake valve construction which is so constituted as to overcome the foregoing objection.

Another object of the invention resides in the provision of a brake valve which comprises a novel arrangement of parts wherein the pedal load required to control the application and release of the brakes is materially reduced, thereby resulting in less driver fatigue in the control of the vehicle brakes.

Still another object is to provide a valve of the above character which not only possesses a reduced pedal load in its operation, but which also has the desirable characteristics of small size, large capacity and simplicity of construction.

A still further object comprehends a novel construction in a valve of the above type which includes as an integral parts, a dampening device which efficiently dampens any undesirable vibration of the parts, thus resulting in a stable operation.

Other objects and novel features of the invention will appear more fully hereinafter from the following detailed description when taken in connection with the accompanying drawing illustrative of two forms of the invention. It will be expressly understood however, that the drawing is employed for purposes of illustration only, and is not to be taken as a definition of the limits of the invention, reference being had for this purpose to the appended claims.

Figure 2:
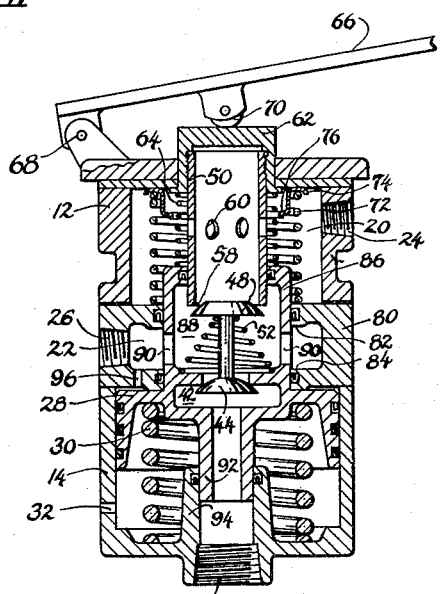

In the drawing, wherein similar reference characters refer to similar parts throughout the several views;

Fig. 1 is a sectional view of one form of brake valve embodying the principles of the present invention, and Fig. 2 is a sectional view of a modified form of brake valve which includes a dampening device.

Referring more particularly to Fig. 1, a self-lapping fluid pressure control valve including the features of the present invention is disclosed therein as including a casing 10 having upper and lower sections 12 and 14, the upper section being provided with partitions 16 and 18 which divide the same into exhaust and outlet chambers 20 and 22 respectively. The exhaust chamber communicates at all times with the atmosphere through an opening 24 while the outlet chamber 22 is adapted to be connected through suitable fluid connections (not shown) which are associated with an opening 26, to the device or devices to be actuated such as the brake chambers of a compressed air vehicle braking system.

The lower casing section 14 slidably houses a pressure responsive element 28 in the form of a piston and such element is constantly urged to the position illustrated as by means of a graduating spring 30. The casing section 14 is constantly open to the atmosphere through passage 32, the said casing section thus constituting an atmospheric chamber 34 in which the element 28 and the spring 30 are contained. At the bottom of the casing section 14 there is provided an inlet port 36 which is adapted to be connected with the supply source of compressed air or other actuating fluid and an inlet tube 38 is secured coaxially with the inlet port 36 and is slidably embraced by a hub portion 40 formed at the lower side of the pressure responsive element 28. As shown, the hub portion 40 is spaced from the top of the element 28 to provide an inlet valve chamber 42 for receiving an inlet valve 44, the latter cooperating with an inlet valve seat 46 which is secured to the top portion of the pressure responsive element 28.

In order to actuate the inlet valve 44 and to control the flow of fluid pressure to and from the outlet chamber 22, a novel construction is provided. As shown, the inlet valve 44 is a part of an integral valve assembly which includes an exhaust valve 48 integrally connected with the inlet valve 44 and normally positioned slightly below a hollow valve actuating plunger 50. The valve assembly comprising the rigidly interconnected valves 44 and 48 are supported solely by a spring 52 which is interposed between the inlet valve seat 46 and the exhaust valve 48. Preferably, the exhaust valve 48 is provided with a winged guide 54 containing a sealing ring 56 engaging the inner surface of the hollow plunger 50, this construction affording a proper guiding support for the valve assembly and offering some friction to relative movement between the plunger 50 and the valve assembly. The lower portion 58 of the plunger 50 constitutes an exhaust valve seat for the exhaust valve 48, which is normally spaced from said valve, and the wall of the plunger 50 is provided with a plurality of openings 60 in order to afford unrestricted communication between the outlet chamber 22 and the exhaust chamber 20 by way of the open valve 48.

In order to normally maintain the plunger 50 in the released position illustrated, a cap 62 is secured to the plunger 50 and the lower edge of such cap is resiliently urged at all times to the position shown as by means of a spring 64 which is interposed between the cap and the partition 16. Thus, with the parts in the released position, exhausting of the outlet chamber 22 will be assured in the manner referred to above. A suitable pedal 66, pivotally connected at 68 with the casing 10 is provided with an actuating member 70 bearing against the cap 62 for the purpose of effecting manual operation of the valve.

In operation, and assuming that the inlet port 36 is connected with a source of compressed air or other fluid and that the outlet port 26 is connected with the brake actuators of a fluid pressure vehicle braking system or other type of fluid pressure actuator, it will readily be seen that in the normal released position illustrated in Fig. 1, the outlet chamber 22 will be connected with the exhaust chamber 20 by way of the open exhaust valve 48 and the ports 60 in the plunger 50. Thus, the vehicle brakes will be in the released position. Upon initial movement of the pedal 66 to apply the brakes, the plunger 50 will be moved downwardly, against the tension of the spring 64 and will first bring the exhaust valve seat 58 into engagement with the exhaust valve 48. This initial movement will serve to interrupt communication between the upper chamber 22 and the exhaust chamber 20. Continued movement of the pedal 66 will move the valve assembly 48, 44 and will serve to open the inlet valve 44 in order to admit compressed air to the outlet chamber 22 by way of the inlet port 36, the inlet tube 38 and the inlet valve chamber 42. Fluid pressure will immediately build up within the outlet chamber 22 and will be conducted to the brake chamber to effect application of the vehicle brakes. During the movement of the valve 44 to open position, that is, during application of the vehicle brakes, the resistance to movement of the pedal 66 will be opposed by the spring 64, the pressure within the outlet chamber 22 acting upon the area of the plunger 50, the valve supporting spring 52 and the area of the inlet valve 44 multiplied by the difference in pressure between that existing in the inlet valve chmaber 42 and that present in the outlet chamber 22. This resistance to movement of the pedal 66, or the pedal load, is relatively small as compared to the types of valves heretofore mentioned.

In the event that the pedal 66 is maintained in a stationary position, after the initial application movement of the valve, it will readily be seen that the top portion of the pressure responsive element 28 is subjected to the fluid pressure within the outlet chamber 22. The element 28 will be thereupon moved downwardly by the fluid pressure in chamber 22 and against the tension of the graduating spring 30 until the inlet valve seat 46 engages the inlet valve 44. As soon as this action occurs, the valve will be balanced or lapped and fluid pressure will be maintained in the outlet chamber 22. At this time, the load on the plunger 50 and the pedal 66 is determined by the tension of the spring 64 and the fluid pressure acting upon the area of the plunger 50. This load will be relatively light as will appear obvious.

In certain instances, it may be desirable to increase the resistance to plunger or pedal movement after a certain predetermined pressure has been supplied to the outlet chamber 22. For this purpose, a pickup spring 72 may be interposed between the partition 16 and the top of the casing section 12 and a spring seat 74 is provided having a flange 76 which is positioned a substantial distance below the lower edge of the cap 62. Thus, after a pressure of say thirty pounds per square inch has been built up in the outlet chamber 22, the cap 62 engages the flange 76 and picks up the load of the pickup spring 72. Thus, upon further application of the brake valve, the movement of the plunger 50 will be opposed not only by the spring 64 but also by the pickup spring 72.

In the event that full reservoir pressure is desired in the outlet chamber 22, the plunger 50 is moved downwardly a sufficient distance so that the hub 40 engages a projection 78 which is formed at the lower end of the casing section 14. This engagement will be effected due to the continued downward movement of the pressure responsive element 28 in response to the increasing pressure built up within the outlet chamber 22. As soon as such engagement is effected, additional downward movement of the plunger 50 will maintain the inlet valve 44 off its seat and thus full reservoir pressure will be admitted to the outlet chamber 22 and to the brake actuators connected therewith.

From the above, it will be obvious that for any predetermined position of the pedal 66 and the plunger 50 there will be a corresponding pressure admitted and maintained in the outlet chamber 22, and such pressure will act upon the pressure responsive element 28 to balance the graduating spring 30 and to close the inlet valve 44 at any particular point in the travel of the pedal 66. On release movement of the pedal 66, the actions heretofore set forth are reversed. In other words, the exhaust valve seat 58 moves upwardly and out of contact with the exhaust valve 48 in order to establish communication between the outlet chamber 22 and the exhaust chamber 20 by way of the ports 60. This causes a regulation of pressure within the outlet chamber 22 so that the graduating spring 30 may move the element 28 and the valves 44, 48 upwardly to re-engage the exhaust valve 48 with the seat 58. Thus, the valve may be lapped during the releasing operation. Upon complete removal of pressure upon the pedal 66, all parts are returned to the normal exhaust position illustrated.

Fig. 2 discloses a modification of the valve of Fig. 1 and all parts which are similar in the two figures have been denoted by the same reference numerals. The essential difference between the two valves is that the valve of Fig. 2 is so arranged that the pressure responsive element 28 is so constructed as to have a restricted communication with the outlet chamber 22 in order that the element 28 may function as an air dampener and hence eliminate any tendency of the element 28 to vibrate in operation. More particularly, and referring to Fig. 2, the valve casing comprises a separate intermediate section 80 which has partitions 82 and 84 defining the outlet chamber 22. In addition, the top of the pressure responsive element 28 is extended to form a cylinder 86 which slidably engages the exterior wall of the plunger 50. With such an arrangement, the outlet chamber 22 also includes a supplemental chamber 88 which communicates with the chamber 22 at all times by way of ports 90 provided in the wall of the cylinder 86. A further distinction from the construction of Fig. 1 includes an extension 92 which depends from the upper face of the element 28 and which is in sealing engagement with the interior wall of an upward extension 94 formed integrally with or secured to the lower wall of the casing section 14.

The operation of the valve device of Fig. 2 is similar to that of Fig. 1 with the exception that the pressure within the outlet chamber 22 is exerted upon an annular portion of the element 28 defined by the casing section 14 and the cylinder 86 through a restricted opening 96 which is formed in the partition 84. Thus, after the inlet valve 44 has been opened, pressure in the outlet chamber 22 will build up on such annular portion of the element 28 by way of the restricted opening 96 and will be confined between such portion and the partition 84. This will secure a dampening action and will avoid any undesired reciprocation of the pressure responsive element 28 during operation of the valve device. Hence, the action will be stable and will result in precise control of the delivered pressures.

It is pointed out that the use of the cylinder 86 enables the formation of the annular volume chamber above the piston 28, which chamber communicates with the outlet chamber 22 only by way of the restriction 96. Thus, during operation of the valve, the pressure build-up on the element 28, due to the restriction 96, will lag that in the outlet chamber, with the result that the inlet valve 44 opens wide and thus affords a rapid build-up of pressure in the outlet chamber. On release of the valve, the pressure in the volume chamber lags that of the outlet chamber 22, thus securing a large opening of the exhaust valve. Furthermore, due to the choking action of the restriction 96, the rate of pressure variations in the volume chamber above the element 28 lags, at all times, that of the pressure in the outlet chamber with the result that a dampening effect is realized due to the relatively slow action of the pressure responsive element 28. This effectively prevents valve chatter or fluttering which might be experienced in the event that the element 28 was totally exposed to the pressure in the outlet chamber 22.

In the construction shown in Fig. 2, the cylinder 86 sealingly engages the plunger 50. This arrangement balances out a substantial part of the effect that pressure in the outlet chamber 22 would exert on the top of the element 28 and thus enables a lighter graduating spring to be utilized.

While no particular reference has heretofore been made with respect to the sealing of the movable parts of the valve in order to prevent undesired leakage, it will be observed that proper seals have been installed in the valves of both figures in order to assure that no such undesirable leakage will take place.

From the foregoing, it will be readily observed that the present invention provides a novel positioning type self-lapping valve which is easily operated to control the application and release of fluid under pressure without necessitating excessive pedal loads. For example, in both forms of the invention, the pedal loads are determined by the relatively light springs 64 and 72 together with the pressure existing across the area of the plunger 50 when the exhaust valve 48 is closed. These pressures are relatively light and hence the valves of the invention may be readily operated without driver fatigue. The valves moreover are relatively small in size due to the avoidance of the use of large diaphragms and may be readily installed in places where space is at a premium. The invention moreover provides an accurate and positive control of delivered pressures in accordance with varying positions of the operating pedal.

While reference has been made herein to the use of the valve for controlling the application of brakes in a compressed air vehicle breaking system, it will be readily understood that the valve may be used in any type of system for the control of fluid pressures. Other modifications of the invention may be resorted to, as well understood by those skilled in the art, without departing from the spirit of the invention. Reference will therefore be had to the appended claims for a definition of the limits of the invention.

What is claimed is:

1. A self-lapping valve for controlling fluid under pressure, comprising a casing having a plurality of stationary partitions therein defining an exhaust chamber at one end, an atmospheric chamber at the other end, and an outlet chamber between the first two chambers, an inlet valve operable to control the flow of fluid under pressure to said outlet chamber, an exhaust valve integrally connected with the inlet valve and positioned in the outlet chamber, a single pressure responsive member in said atmospheric chamber, means comprising a restricted passageway formed in one of said partitions to subject said member to fluid pressure in said outlet chamber to move said member in one direction to close the inlet valve, said inlet valve being positioned within an inlet valve chamber formed in said member, means for conducting fluid under pressure directly to said inlet valve chamber, a spring between the exhaust valve and said member for supporting said valves in a position to close the inlet valve, means including a slidable plunger extending through said exhaust chamber and having a seat normally spaced from said exhaust valve for connecting the outlet chamber with the exhaust chamber, a cylinder carried by the pressure responsive member and communicating with the outlet chamber, said cylinder extending through said partitions and having a part enclosing the exhaust valve and slidably engaging the plunger, and means for moving said plunger in said one direction to successively close the exhaust valve and open the inlet valve.

2. A self-lapping valve for controlling fluid pressure, comprising a casing having opposite end walls and side walls, and having also, a pair of spaced-apart partitions connected with said side walls to provide in the casing an exhaust chamber at one end, an atmospheric chamber at the other end, and an outlet chamber between the exhaust and atmospheric chambers, a single piston movably mounted in the atmospheric chamber, a graduating spring in the atmospheric chamber interposed between one end wall of the casing and said piston and normally urging the piston into engagement with one of said partitions, said last named partition having an opening therein to expose a portion of said piston at all times to the fluid pressure within the outlet chamber, and said piston having an inlet chamber formed therein, means for conducting fluid under pressure through said atmospheric chamber and directly to said inlet chamber at all times, said means comprising a tubular inlet member secured to said one end wall centrally thereof and extending axially into said atmospheric chamber, said piston having a part sealingly engaging said inlet member, and means for controlling the flow of fluid under pressure from the inlet chamber to the outlet chamber and from the latter to the exhaust chamber, comprising a valve assembly having rigidly connected inlet and exhaust valves, said inlet valve being positioned in the inlet chamber and the exhaust valve being positioned in the outlet chamber, a valve spring interposed between the exhaust valve and the piston and positioned wholly within the outlet chamber, and said valve spring normally maintaining the valve assembly in a position to close the inlet valve, the other end wall and the other partition being provided with axially spaced aligned openings therein, a manually operable hollow plunger extending through said opening in the other end wall with the interior of said plunger communicating at all times with said exhaust chamber, said plunger having its lower end open and having a cap at its upper end slidably received in the opening in said other end wall, resilient means engaging said cap for normally maintaining said plunger in a position where the open end thereof is spaced from said exhaust valve to normally connect the outlet chamber with the exhaust chamber through said hollow plunger, and manually operable means to move said plunger to first engage said open end with the exhaust valve to interrupt communication between the outlet chamber and the exhaust chamber and to then move the valve assembly in opposition to the valve spring to open the inlet valve to establish communication between the inlet chamber and the outlet chamber, said piston being movable by fluid pressure in the outlet chamber to close said inlet valve.

3. A self-lapping valve as set forth in claim 2 wherein said hollow plunger also extends through the opening in said other partition.

4. A self-lapping valve as set forth in claim 3 wherein said resilient means is interposed between said cap and said other partition.

5. A self-lapping valve as set forth in claim 4 which includes in addition, a cylinder carried by said piston and communicating with the outlet chamber, said cylinder extending through said partitions and having a part surrounding the exhaust valve and slidably engaging the hollow plunger.

6. A self-lapping valve for controlling fluid pressure, comprising a casing having upper and lower end walls, a pair of partitions within the casing, one of said partitions forming an exhaust chamber with said upper end wall and the other partition forming an atmospheric chamber with said lower end wall and said partitions being spaced apart to form with the casing, an outlet chamber positioned between the exhaust and atmospheric chambers, a single pressure responsive member movably mounted in the atmospheric chamber, said other partition having an opening so that said member is subjected at all times to the fluid pressure in the outlet chamber, a graduating spring in the atmospheric chamber interposed between the pressure responsive member and said lower end wall to normally urge the member in the direction toward said outlet chamber and into engagement with said other partition, an inlet chamber formed in said pressure responsive member, means for conducting fluid under pressure directly to said inlet chamber, and means for controlling the flow of fluid under pressure from the inlet chamber to the outlet chamber and from the latter to the exhaust chamber comprising a valve assembly having rigidly inter-connected inlet and exhaust valves, said inlet valve being positioned in the inlet chamber and the exhaust valve being positioned in the outlet chamber, a valve supporting spring interposed between the pressure responsive member and the exhaust valve for maintaining the valve assembly in position with the inlet valve closed, and a manually operable plunger movable to first contact said exhaust valve to interrupt communication between the outlet chamber and the exhaust chamber and to then move the valve assembly in opposition to said valve supporting spring to open the inlet valve to establish communication between the inlet chamber and the outlet chamber, said pressure responsive member being movable by fluid pressure in said outlet chamber to close said inlet valve, and a cylinder carried by the pressure responsive member and communicating with the outlet chamber, said cylinder extending through said partitions and having a part surrounding the exhaust valve and slidably engaging the manually operable plunger.

7. A self-lapping valve for controlling fluid under pressure, comprising a casing having a plurality of stationary partitions therein defining an exhaust chamber at one end, an atmospheric chamber at the other end, and an outlet chamber between the first two chambers, an inlet valve operable to control the flow of fluid under pressure to said outlet chamber, an exhaust valve connected with the inlet valve and positioned in the outlet chamber, a pressure responsive member in said atmospheric chamber, said member having a cylinder connected therewith which slidably extends through an opening in one of the partitions and communicates with the outlet chamber, said cylinder defining with said one partition, an annular volume chamber above said member, means affording restricted communication between the outlet chamber and said volume chamber to subject said member to fluid pressure in said outlet chamber to move said member in one direction to close the inlet valve, a spring between the exhaust valve and said member for supporting said valves on said member, means including a slidable plunger extending through said exhaust chamber and having a seat normally spaced from said exhaust valve for connecting the outlet chamber with the exhaust chamber, and means for moving said plunger in said one direction to successively close the exhaust valve and open the inlet valve.

References Cited in the file of this patent

UNITED STATES PATENTS

| | | |
|---|---|---|
| 1,588,660 | Christensen | June 15, 1926 |
| 1,599,619 | Mitton | Sept. 14, 1926 |
| 2,049,984 | Vorech et al. | Aug. 4, 1936 |
| 2,133,275 | Andres et al. | Oct. 18, 1938 |
| 2,375,110 | Hufferd | May 1, 1945 |
| 2,381,222 | May | Aug. 7, 1945 |
| 2,389,058 | Kelley | Nov. 13, 1945 |
| 2,398,877 | Bent | Apr. 23, 1946 |